(12) United States Patent
Simpson et al.

(10) Patent No.: US 6,927,869 B1
(45) Date of Patent: Aug. 9, 2005

(54) PURCHASING AND PRINTING DOCUMENTS FROM THE INTERNET

(75) Inventors: Shell S. Simpson, Boise, ID (US); James Clough, Meridian, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 09/350,516

(22) Filed: Jul. 9, 1999

(51) Int. Cl.[7] .................. G06K 15/02; G06F 3/12; G06F 13/00
(52) U.S. Cl. .................. 358/1.15; 358/1.9; 358/1.14
(58) Field of Search .................. 358/1.15, 1.13, 358/1.14; 709/200, 203, 233, 224–232; 710/1–19, 710/31–35

(56) References Cited

U.S. PATENT DOCUMENTS 5,819,047 A * 10/1998 Bauer et al. .................. 709/229
6,003,069 A * 12/1999 Cavill .................. 709/205
6,012,083 A * 1/2000 Savitzky .................. 709/202
6,070,798 A * 6/2000 Nethery .................. 235/462.01

* cited by examiner

Primary Examiner—Douglas Tran

(57) ABSTRACT

An original receipt is created for a document on a server. The receipt is copied from the server to a print job agent. The print job agent requests a page of the document from the server. The server provides the requested page to the print job agent then updates the original receipt to indicate the requested page has been provided to the print job agent. The print job agent communicates the requested page to an output device. The output device prints the page. When the output device has finished printing the page, the output device confirms to the print job agent that the page has been successfully printed. Once the print job agent receives confirmation from the output device that the page has been printed, the print job agent updates the copy of the receipt to indicate that the page has been printed.

17 Claims, 2 Drawing Sheets

PURCHASING AND PRINTING DOCUMENTS FROM THE INTERNET

FIELD OF THE INVENTION

This invention relates in general to printing documents from a network and, more particularly, to a system and method for providing tamper resistant document purchasing and printing over the Internet.

BACKGROUND OF THE INVENTION

Many publishers and vendors of publications offer Internet purchasing services where consumers may buy publications over the Internet. Once purchased, the publications are typically delivered by a parcel service that may take two to three days.

Some consumers would rather immediately print a purchased document or a portion of the document rather than wait for it to be delivered. However the publishers and vendors are reluctant to provide a document to a consumer in electronic format for printing since, once provided in electronic format, the document may easily be copied and distributed to others without compensation to the publisher.

In order to provide a satisfactory solution to the publishers and vendors, a document provided in electronic form to a consumer must have some copy protection so that multiple copies of the document may not be printed. However, the copy protection must allow a consumer to reprint pages that were not properly printed the first time.

SUMMARY OF THE INVENTION

According to principles of the present invention, an original receipt is created for a document on a server. The receipt is copied from the server to an agent service. The agent service requests a page of the document from the server. The server provides the requested page to the agent service then updates the original receipt to indicate the requested page has been provided to the agent service. The agent service communicates the requested page to an output device. The output device prints the page. When the output device has finished printing the page, the output device confirms to the agent service that the page has been successfully printed. Once the agent service receives confirmation from the output device that the page has been printed, the agent service updates the copy of the receipt to indicate that the page has been printed.

According to further principles of the present invention, the page is encrypted before being provided to the agent service. The output device then decrypts the page before printing the page.

Other objects, advantages, and capabilities of the present invention will become more apparent as the description proceeds.

DETAILED DESCRIPTION OF THE INVENTION

Figure 1:
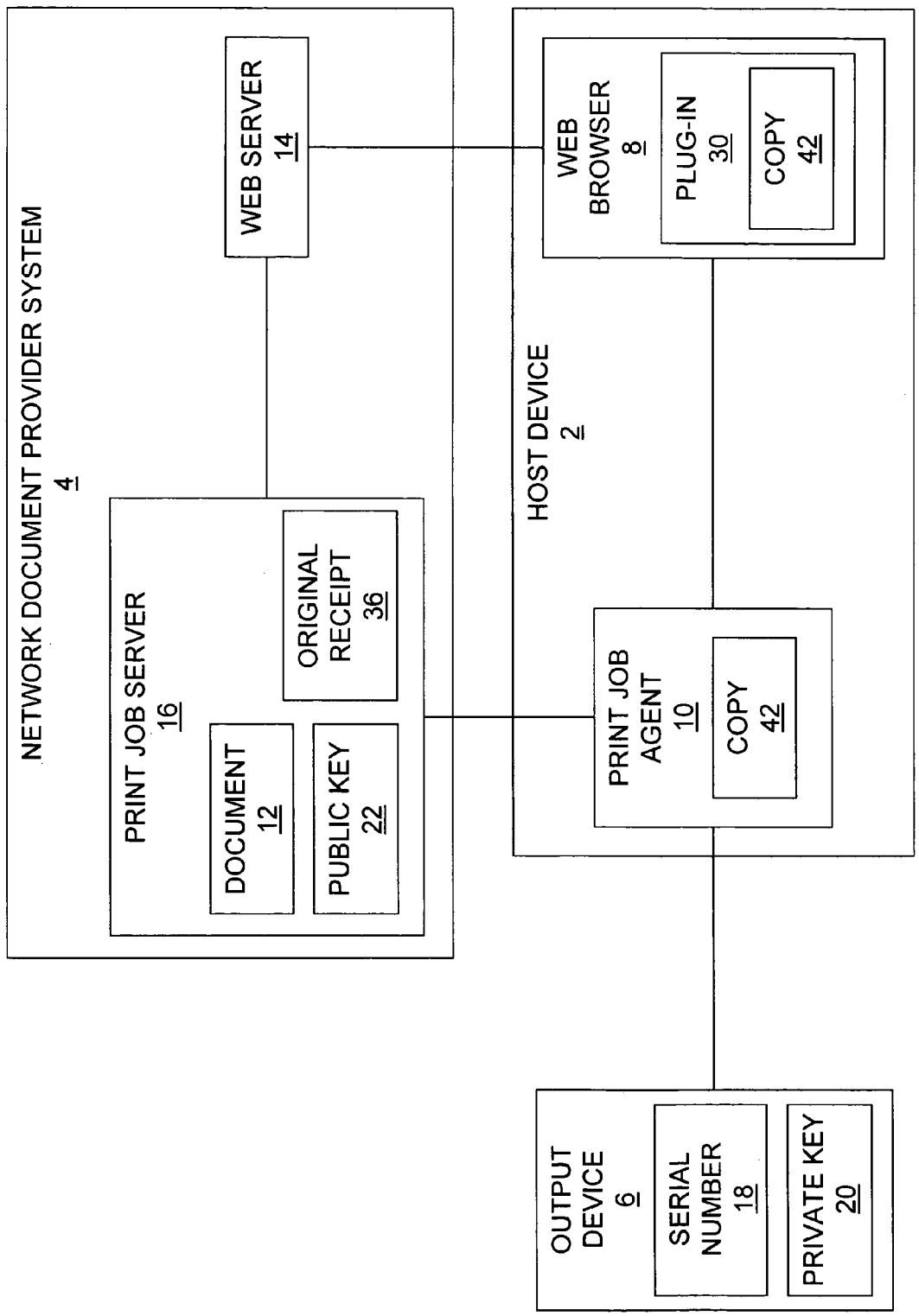
FIG. 1 is block diagram illustrating one embodiment of a system of the present invention for printing a document from a server.

FIG. 1 illustrates, in block diagram form, one embodiment of the present invention. A host device 2 communicates with a network document provider system (NDPS) 4 and an output device 6. Running as applications on host device 2 are web browser 8 and print job agent 10. Host device 2 is any device or system, such as a general purpose computer, capable of running web browser 8 and agent service 10 and also communicating with NDPS 4 and output device 6.

NDPS 4 is a device or system that includes a web server 14 and a print job server 16. Web server 14 and print job server 16 either reside on a single general purpose computing device (not shown) or web server 14 and print job server 16 reside on any number of devices or systems, either together or separately. Document 12 resides on NDPS 4. In one embodiment, document 12 also resides on print job server 16.

Output device 6 is any device capable of printing a document. Optionally, output device 6 includes a serial number 18 having an associated private key 20. Serial number 18 and private key 20 are unique to output device 6. Private key 20 has a corresponding public key 22 that is accessible by print job server 16. Public key 22 is a key for encrypting documents that may only be decrypted using private key 20.

Figure 2:
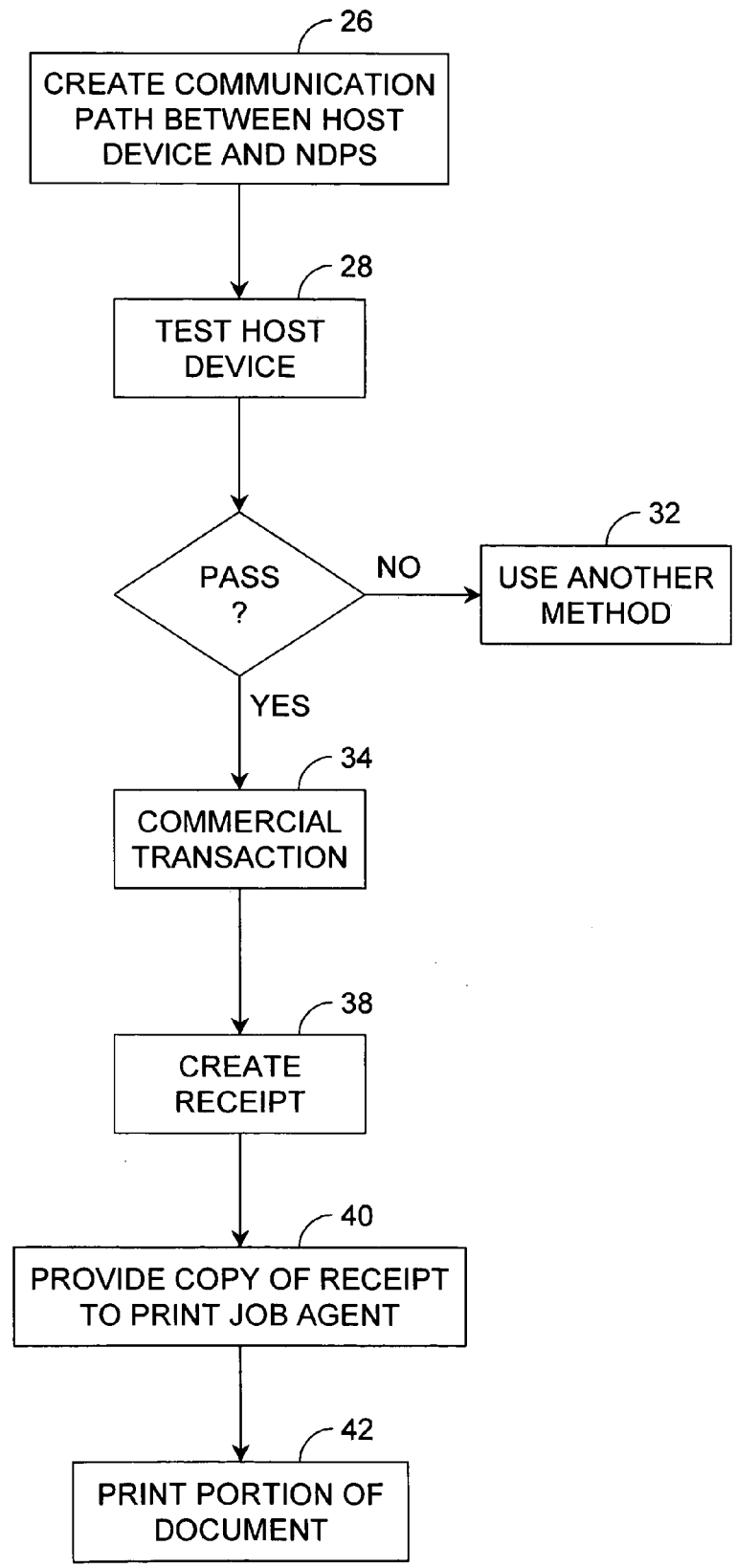
FIG. 2 is a flow chart illustrating one embodiment of the method of the present invention.

Referring now to FIG. 2, a method is illustrated for printing document 12 or a portion of document 12. If host device 2 and NDPS 4 are not already communicating, a communication path 24 is created 26 between host device 2 and NDPS 4. Creating 26 communication path 24 may be accomplished in any manner. For example, communication path 24 may be created by browsing to web server 14 using web browser 8.

Next, web server 14 tests 28 host device 2 to determine whether host device 2 includes the necessary software for running agent service 10. Although it is desirable that web server 14 test 28 host device 2, it is not necessary. In order to test 28 host device 2, web server 14 provides content to web browser 8 causing web browser 8 to load a plug-in 30. Plug-in 30 sends information back to web server 14 indicating that host device 2 includes the necessary software for running agent service 10. If plug-in 30 does not load or does not send the information to web server 14, host device 2 fails the test 28 and an alternate method for providing document 12 to a user of host device 2 is used 32.

Alternatively, instead of using plug-in 30 to send the information to web server 14, web server 14 may query web browser 8 using signed Java applets to determine whether host device 2 includes the necessary software for running agent service 10.

If document 12 is to be purchased, web server 14 and browser 8 interact to perform a commercial transaction 34. Alternatively, no commercial transaction need take place or the commercial transaction may take place at a different time or through a different medium, such as a telephone transaction.

An original receipt 36 is then created 38 on print job server 16. Optionally, a copy 42 is then made and provided 40 to print job agent 10. Copy 42 is first transferred through web server 14 to web browser 8. Copy 42 causes plug-in 30 to load, if it has not already loaded. Plug-in 30 transfers copy 42 to print job agent 10.

Next, a portion of document 12 is transferred 42 to print job agent 10. The portion may be any amount of document 12 or all of document 12. A convenient size for the portion is one page.

Any means of transferring 42 the portion of document 12 to print job agent 10 will suffice. In one embodiment, in order to provide a portion of document 12 to print job agent 10, first print job agent 10 initiates a session between print job agent 10 and print job server 16. Next, print job agent 10 obtains serial number 18 from output device 6 and relays serial number 18 to print job server 16. Print job server 16 then uses serial number 18 to obtain public key 22. Print job agent 10 then requests the portion of document 12 from print job server 16.

Upon receiving the request, print job server 16 references original receipt 36 to ensure that print job server 16 has not already send the portion of document 12 more than an acceptable number of times. A vendor or publisher may determine how many times print job server 16 may send each portion of a document 12 to print job agent 10. Allowing some number of resends accounts for possible errors in printing portions of document 12. Limiting the number of resends prevents multiple complete reprinting of document 12.

If the portion of document 12 has not yet been sent more than the acceptable number of times, print job server 16 encrypts the portion of document 12 using public key 22 and provides the encrypted portion of document 12 to print job agent 10. Print job server 16 then updates original receipt 36 to indicate the portion of document 12 has been sent to print job agent 10.

In an alternate embodiment, a symmetric key is encrypted by print job server 16 using public key 22 and then sent to print job agent 10. Print job agent 10 forwards the encrypted symmetric key to output device 6. Output device 6 then decrypts the symmetric key. Print job server 16 uses the symmetric key to encrypt the portion of document 12 before providing the portion of document 12 to print job agent 10. In still another embodiment, the portion of document 12 is not encrypted before being sent to print job agent 10.

If the portion of document 12 was encrypted using public key 22, output device 6 decrypts the portion of document 12 using private key 20. If the portion of document 12 was encrypted using a symmetric key, output device 6 decrypts the portion of document 12 using the symmetric key. If the portion of document 12 is not encrypted, no decryption is performed by output device 6. Output device 6 then prints 42 the portion of document 12.

Next, if desired, output device 6 may report to print job agent 6 that the portion of document 12 has been successfully printed. If copy 42 has been provided to print job agent 10, print job agent 10 optionally updates copy 42 to indicate the portion of document 12 has been successfully printed.

If more than one portion of document 12 is to be printed, either print job agent 10 requests the next portion of document 12 or print job server 16 decides to send the next portion of document 12. The process of providing portions of document 12 to print job agent 10 and output device 6 continues until all of the desired portions of document 12 have been printed. It is not necessary for a portion of document 12 to finish printing before the next portion of document 12 is sent to print job agent 10.

In one embodiment of the present invention, if a printing error occurs while printing a portion of document 12, print job agent 10 notifies print job server 16 and print job server 16 resends the portion that failed to print properly. This provides a means to overcome printing errors. However, a publisher or vendor may limit the number of times a portion of document 12 may be reprinted by setting the acceptable number of times a portion of document 12 may be reprinted.

It should be understood that the foregoing description is only illustrative of the invention. Various alternatives and modifications can be devised by those skilled in the art without departing from the invention. Accordingly, the present invention is intended to embrace all such alternatives, modifications and variances that fall within the scope of the appended claims.

What is claimed is:

1. A method for printing a document accessible by a server, the method comprising:
   (a) creating on the server an original receipt specific to the document;
   (b) providing at least one page of the document from the server to a print job agent;
   (c) updating the original document specific receipt to indicate the at least one page of the document was provided to the print job agent;
   (d) communicating the at least one page of the document from the print job agent to an output device;
   (e) printing the at least one page of the document using the output device;
   (f) copying the original document specific receipt to the print job agent; and,
   (g) updating the copy of the receipt to indicate the at least one page of the document was printed.

2. The method of claim 1 further including before providing the at least one page of the document from the server to the print job agent, the print job agent requesting the at least one page of the document.

3. The method of claim 1 further including uniquely identifying the output device to the server.

4. The method of claim 3 wherein uniquely identifying the output device to the server includes conveying a serial number of the output device to the server.

5. The method of claim 1 further including:
   (a) the server encrypting the at least one page of the document before providing the at least one page of the document to the print job agent; and,
   (b) the print job agent decrypting the at least one page of the document before communicating the at least one page of the document to the output device.

6. The method of claim 5 further including:
   (a) uniquely identifying the output device to the sewer;
   (b) the server obtaining a device specific public key for the output device; and,
   wherein the server encrypting the at least one page of the document includes the server using the public key to encrypt the at least one page of the document.

7. The method of claim 5 further including the server communicating a symmetric key to the output device and wherein the server encrypting the at least one page of the document includes the server using the symmetric key to encrypt the at least one page of the document.

8. A system for printing a document accessible by a server, the method comprising:
   (a) a server having access to a document;
   (b) means for creating an original receipt specific to the document on the server;
   (c) a print job agent;
   (d) means for providing at least one page of the document from the server to the print job agent;
   (e) means for updating the original document specific receipt to indicate each page of the document provided to the print job agent;

(f) an output device for printing the at least one page of the document;

(g) means for communicating the at least one page of the document from the print job agent to the output device;

(h) means for copying the original document specific receipt to the print job agent; and, (i) means for updating the copy of the receipt to indicate each page of the document printed.

9. The system of claim 8 further including means for the print job agent to request at least one page of the document from the Server.

10. The system of claim 8 further including means for uniquely identifying the output device to the server.

11. The system of claim 10 wherein the means for uniquely identifying the output device to the server includes means for conveying a serial number of the output device to the server.

12. The system of claim 8 wherein:
(a) the server further includes means for encrypting the at least one page of the document; and,
(b) the print job agent further includes means for decrypting an encrypted page of the document.

13. The system of claim 12 further including:
(a) means for uniquely identifying the output device to the Server;
(b) means for providing to the server a device specific public key for the output device; and,
wherein the means for encrypting the at least one page of the document includes means for using the public key to encrypt the at least one page of the document.

14. The system of claim 12 further including means for communicating a symmetric key to the output device and wherein the means for encrypting the at least one page of the document includes means for using the symmetric key to encrypt the at least one page of the document.

15. A program storage system readable by a computer, tangibly embodying a program, applet, or instructions executable by the computer to perform method steps for printing a document accessible by a server, the method steps comprising:

(a) creating on the server an original receipt specific to the document;

(b) providing at least one page of the document from the server to a print job agent;

(c) updating the original document specific receipt to indicate the at least one page of the document was provided to the print job agent;

(d) communicating the at least one page of the document to an output device for printing the at least one page of the document;

(e) copying the original document specific receipt to the print job agent; and, (f) updating the copy of the receipt to indicate the at least one page of the document was printed.

16. The program storage system of claim 15 wherein the method steps further include uniquely identifying the output device to the server.

17. The program storage system of claim 15 wherein the method steps further include:

(a) encrypting the at least one page of the document before providing the at least one page of the document from the server to the print job agent; and, (b) decrypting the at least one page of the document before communicating the at least one page of the document from the print job agent to the output device.

* * * * *